United States Patent
Lan et al.

(10) Patent No.: US 9,883,227 B1
(45) Date of Patent: Jan. 30, 2018

(54) AUDIOVISUAL SIGNAL PROCESSING CIRCUIT AND ASSOCIATED TELEVISION SIGNAL PROCESSING METHOD

(71) Applicant: MStar Semiconductor, Inc., Hsinchu Hsien (TW)

(72) Inventors: Ching-Fu Lan, Hsinchu County (TW); Ying-Chao Chou, Hsinchu County (TW); Chih-Ching Chao, Hsinchu County (TW); Huang-Hsiang Lin, Hsinchu County (TW); Jung-Kuei Chang, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/459,376

(22) Filed: Mar. 15, 2017

(30) Foreign Application Priority Data

Jul. 22, 2016 (TW) .............................. 105123148 A (51) Int. Cl.
| | |
|---|---|
| *H04N 7/173* | (2011.01) |
| *H04N 21/426* | (2011.01) |
| *H04N 21/439* | (2011.01) |
| *H04N 21/44* | (2011.01) |
| *H04N 7/01* | (2006.01) |

(52) U.S. Cl.
CPC ..... *H04N 21/42607* (2013.01); *H04N 21/439* (2013.01); *H04N 21/44* (2013.01); *H04N 7/01* (2013.01)

(58) Field of Classification Search
CPC .................................................... H04N 7/01
USPC .......................................................... 725/131
See application file for complete search history.

(56) References Cited

U.S. PATENT DOCUMENTS

| | | | | |
|---|---|---|---|---|
| 6,438,183 | B1 * | 8/2002 | Taura | ........... H04L 27/2657 375/326 |
| 2004/0029542 | A1 * | 2/2004 | Klingberg | ............... H04B 1/04 455/131 |

FOREIGN PATENT DOCUMENTS

| | | |
|---|---|---|
| CN | 204598155 | 8/2015 |
| TW | 200820765 | 5/2008 |
| TW | 201114260 | 4/2011 |

OTHER PUBLICATIONS

Simon Haykin, Communication Systems 4th ed., McMaster University, John Wiley & Sons, Inc., 2001, pp. 93-103, 221-223, 373-376.

* cited by examiner

*Primary Examiner* — Michael Hong
(74) *Attorney, Agent, or Firm* — WPAT, PC (57) ABSTRACT

A television signal processing circuit includes an audio/video (AV) signal generating circuit, an intermediate frequency (IF) mixer, a first filter, a radio-frequency (RF) mixer, a second filter and a digital-to-analog converter (DAC). The AV signal generator generates a digital AV signal. The IF mixer converts the digital AV signal to an IF AV signal. The first filter filters the IF AV signal to generate a filtered IF AV signal. The RF mixer converts the filtered IF AV signal to an RF AV signal. The second filter filters the RF AV signal to generate a filtered RF AV signal. The DAC converts the filtered RF AV signal to an analog AV signal and transmits the analog AV signal to an antenna.

18 Claims, 6 Drawing Sheets

AUDIOVISUAL SIGNAL PROCESSING CIRCUIT AND ASSOCIATED TELEVISION SIGNAL PROCESSING METHOD

This application claims the benefit of Taiwan application Serial No. 105123148, filed Jul. 22, 2016, the subject matter of which is incorporated herein by reference.

BACKGROUND OF THE INVENTION

Field of the Invention

The invention relates in general to signal processing, and more particularly to a television processing circuit applied to a set-up box (STB) and an associated television signal processing method.

Description of the Related Art

Demands of common households on set-up boxes (STBs) increase along with the broadcasting of digital televisions. As some older televisions are not equipped with audio/video (AV) ports for connecting to the STB, the STB needs an additional set of circuit designed for transmitting (AV) signals to these older televisions. In a conventional solution, a digital AV signal is converted to an analog signal, which is then processed and transmitted. Therefore, a more complex circuit design is required. For example, a surface acoustic wave (SAW) filter needs to be designed to filter out analog radio-frequency (RF) signals, in a way that production complications and costs are increased.

SUMMARY OF THE INVENTION

It is an object of the present invention to provide a television signal processing circuit disposed in a set-up box (STB). Main signal processing circuits and a filters in the television signal processing circuit are implemented by digital circuits, with the filters having a simpler design structure, thereby solving issues of the prior art.

A television signal processing circuit applied to an STB is disclosed according to an embodiment of the present invention. The signal processing circuit includes an audio/video (AV) signal generator, an intermediate-frequency (IF) mixer, a first filter, a radio-frequency (RF) mixer, a second filter and a digital-to-analog converter (DAC). The AV signal generator generates a digital AV signal. The IF mixer generates an IF AV signal according to the digital AV signal. The first filter filters the IF AV signal to generated a filtered IF AV signal. The RF mixer generates an RF AV signal according to the filtered IF AV signal. The second filter filters the RF AV signal to generate a filtered RF AV signal. The DAC converts the filtered RF AV signal to an analog AV signal, and transmits the analog AV signal to an antenna.

A television signal processing method is disclosed according to another embodiment of the present invention. The method includes: generating a digital AV signal; generating an IF AV signal according to the digital AV signal; filtering the IF AV signal to generate a filtered IF AV signal; generating an RF AV signal according to the filtered IF AV signal; filtering the RF AV signal to generate a filtered RF AV signal; and converting the filtered RF AV signal to an analog AV signal and transmitting the analog AV signal to an antenna.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
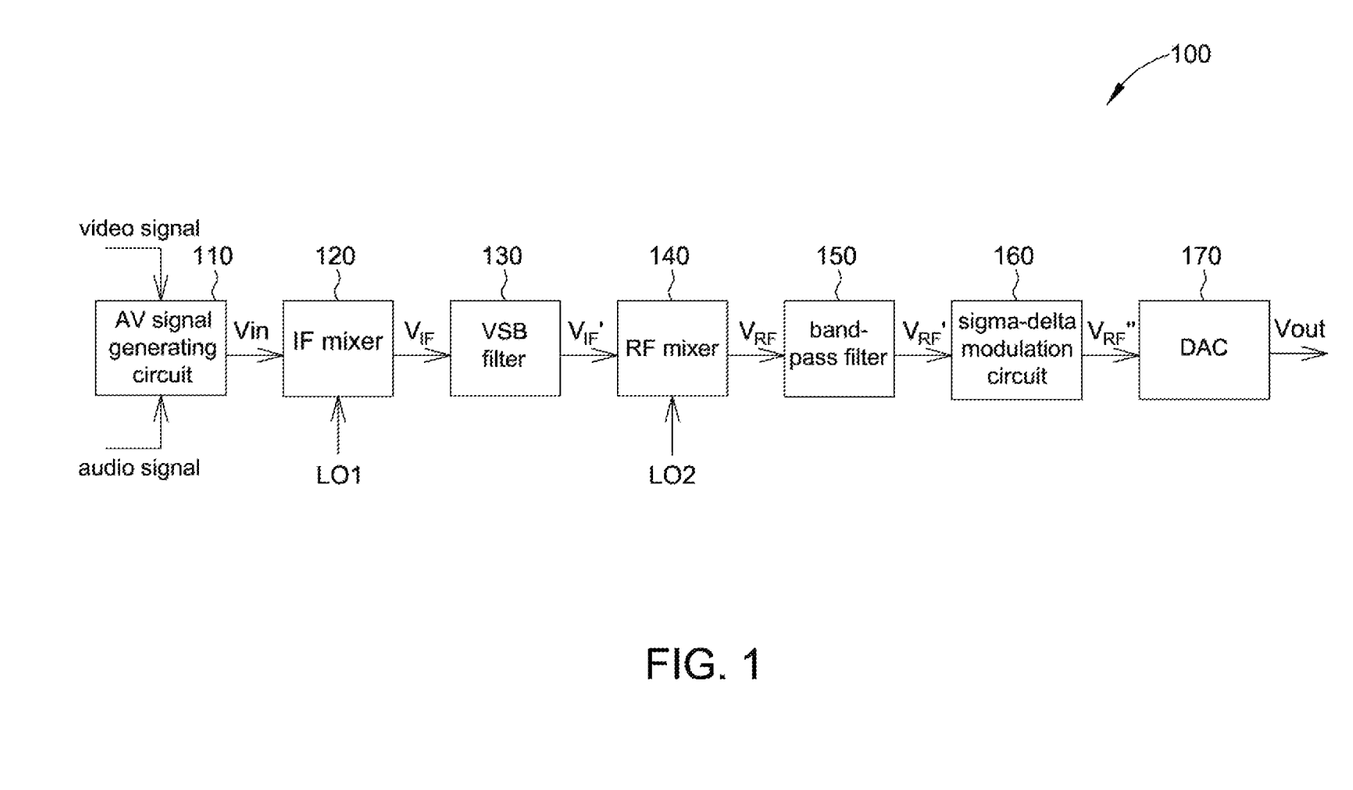
FIG. 1 is a block diagram of a television signal processing circuit according to an embodiment of the present invention.

FIG. 1 shows a block diagram of a television signal processing circuit 100 according to an embodiment of the present invention. As shown in FIG. 1, the television signal processing circuit 100 includes an audio/video (AV) signal generating circuit 110, an intermediate-frequency (IF) mixer 120, a vestigial sideband filter 130, a radio-frequency (RF) mixer 140, a band-pass filter 150, a sigma-delta modulation circuit 160 and a digital-to-analog converter (DAC) 170. In this embodiment, the television signal processing circuit 100 is a single chip, and is disposed in an set-up box (STB). Further, the television signal processing circuit 100 generates a plurality of television channel signals having predetermined frequencies through an antenna of the STB to an external television. The plurality of television channel signals having the predetermined frequencies may be signals of the third and the fourth channels (with frequencies 61.25 MHz and 67.25 MHz, respectively) defined by the National Television System Committee (NTSC), or signals of the third and the fifth channels (with frequencies 55.25 MHz and 63.25 MHz, respectively) defined by the Progressive Alternating Line (PAL) standard.

Figure 2:
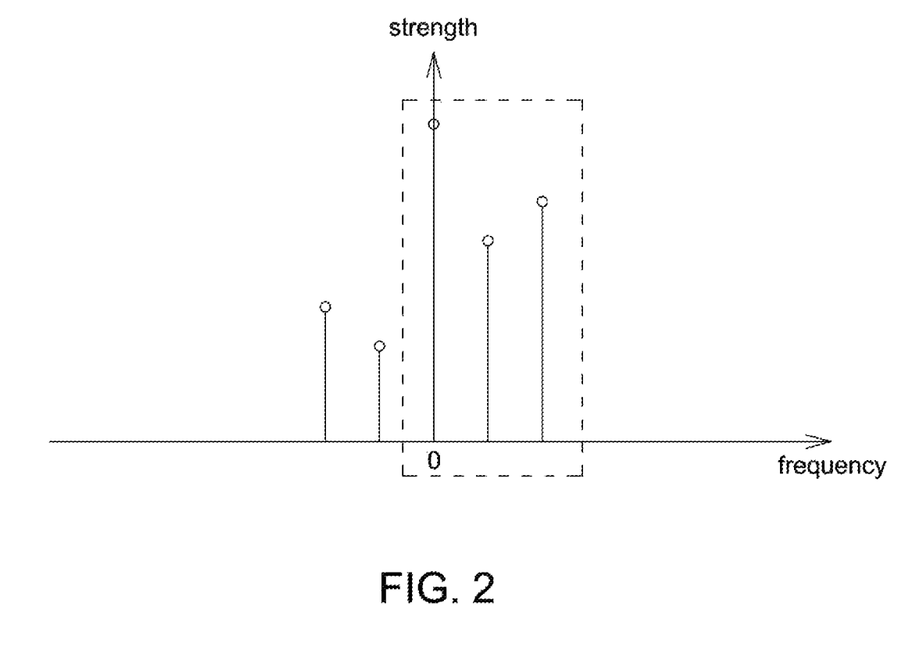
FIG. 2 is a spectrum diagram of a digital audio/video (AV) signal.
Figure 3:
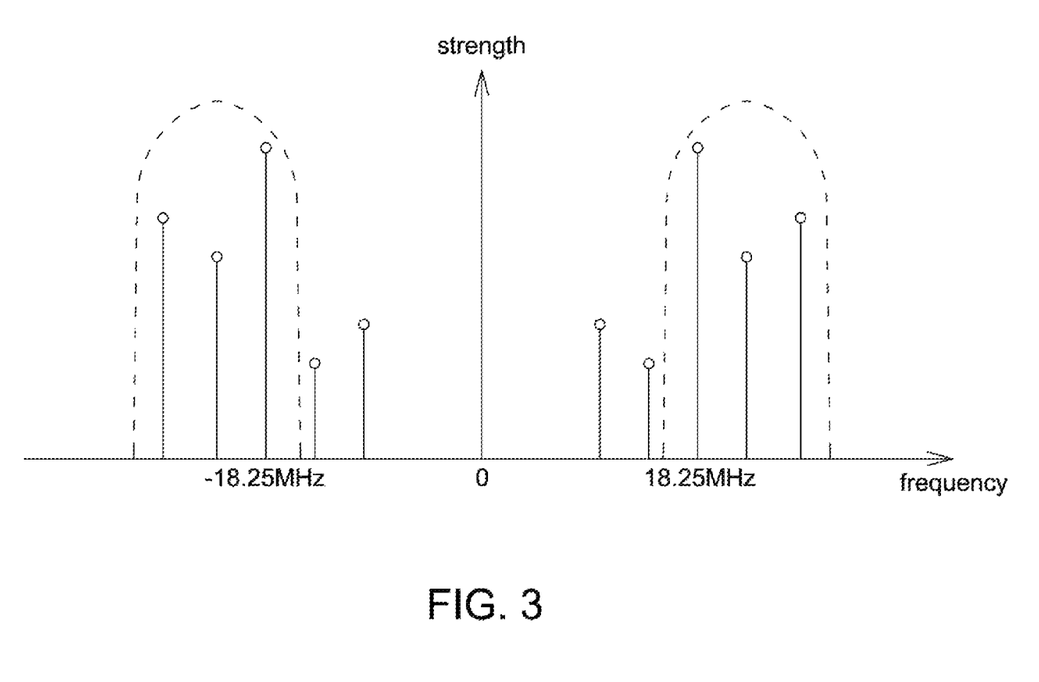
FIG. 3 is a spectrum diagram of an intermediate-frequency (IF) signal and a schematic diagram of a frequency that a vestigial sideband (VSB) filter allows passing.

In an operation process of the television signal processing circuit 100, the AV signal generator 110 receives a digital video signal and a digital audio signal to generate a digital AV signal Vin, whose spectrum is as shown in FIG. 2. Even if a digital television signal received is converted to an analog signal, a television may not be able to decode the contents in the analog signal. Therefore, the digital television signal that the STB receives needs to be first decoded to obtain the video signal and the audio signal. The video signal and the audio signal are then re-coded to a digital AV signal Vin according to formats compliant with the NTSC or PAL standards. The IF mixer 120 converts the digital AV signal Vin to an intermediate-frequency (IF) AV signal $V_{IF}$ by using a local oscillation signal LO1, and the vestigial sideband filter 130 filers the IF AV signal $V_{IF}$ to generate a filtered IF AV signal $V_{IF}'$. FIG. 3 shows a spectrum diagram of the IF AV signal $V_{IF}$, with parts framed within the dotted lines being frequencies that the vestigial sideband filter 130 allows passing. In this embodiment, the center frequencies of the IF AV signal $V_{IF}$ are 18.25 MHz and −18.25 MHz.

Figure 4:
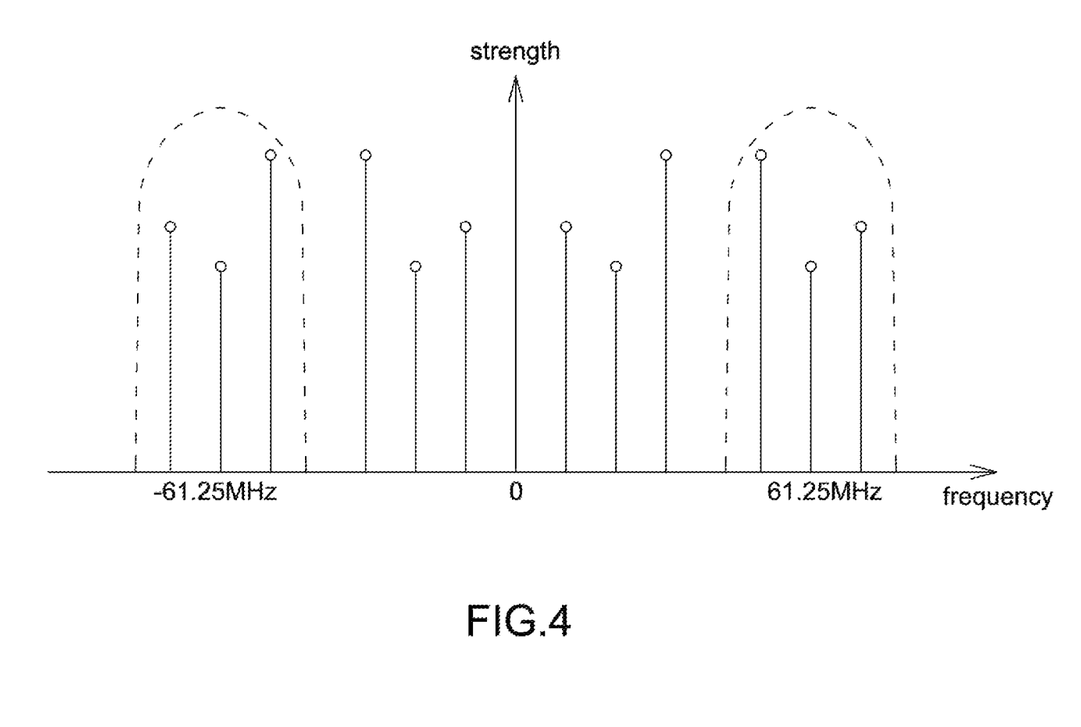
FIG. 4 is a spectrum diagram of a radio-frequency (RF) signal and a schematic diagram of a frequency that a band-pass filter allows passing.

Referring to FIG. 2, due to the asymmetry in the input signal, a complex filter is needed to filter out the baseband signals in the parts within the dotted lines. In contrast, in FIG. 3, the signal is symmetrical after it is adjusted to the intermediate frequency, and vestigial sideband filtering may be implemented by real filter, hence reducing the complexity and production costs of the filter. Next, the RF mixer 140 converts the filtered IF AV signal $V_{IF}'$ to an RF AV signal $V_{RF}$ by using a local oscillation signal LO2, and the band-pass filter 150 filters the RF AV signal $V_{RF}$ to generate a filtered RF AV signal $V_{RF}'$. FIG. 4 shows a spectrum diagram of the RF AV signal $V_{RF}$, with the parts framed within the dotted lines representing the frequency that the band-pass filter 150 allows passing. In this embodiment, the center frequencies of the RF AV signal $V_{RF}$ are 61.25 MHz and −61.25 MHz. The sigma-delta modulation circuit 160 performs a noise shifting process on the filtered RF AV signal $V_{RF}'$ to generate a process signal $V_{RF}''$, and transmits the process signal $V_{RF}''$ to the DAC 170 to be converted to an analog AV signal Vout. The analog AV signal is then transmitted to a television via an antenna. The center frequency 61.25 MHz of the RF AV signal $V_{RF}$ is the frequency of the third channel defined by the NTSC.

The frequency 18.25 MHz shown in FIG. 3 and the frequency 61.25 MHz shown in FIG. 4 are examples for illustration purposes, and are not to be construed as limitations to the present invention. In other embodiments, the IF frequency shown in FIG. 3 may have different frequencies according to the planning of a designer, and the frequency shown in FIG. 4 may also be a frequency corresponding to a predetermined frequency in other television standards. For example, the frequency in FIG. 4 may be the frequency 67.25 MHz of the fourth channel defined by the NTSC, or the frequencies 55.25 MHz and 63.25 MHz of the third and the fifth channels defined by the PAL standard.

In the television signal processing circuit 100 in FIG. 1, most signal processing units and all of the filter circuits are implemented by digital circuits, and are integrated in one single chip, thereby significantly simplifying the circuit structure and reducing production costs. Further, by adjusting the signal to the intermediate frequency to perform vestigial sideband filtering, a real filter having a simpler structure, instead of a SAW filter or a complex filter, may be adopted in the television signal processing circuit 100 to further lower design and production costs.

Figure 5:
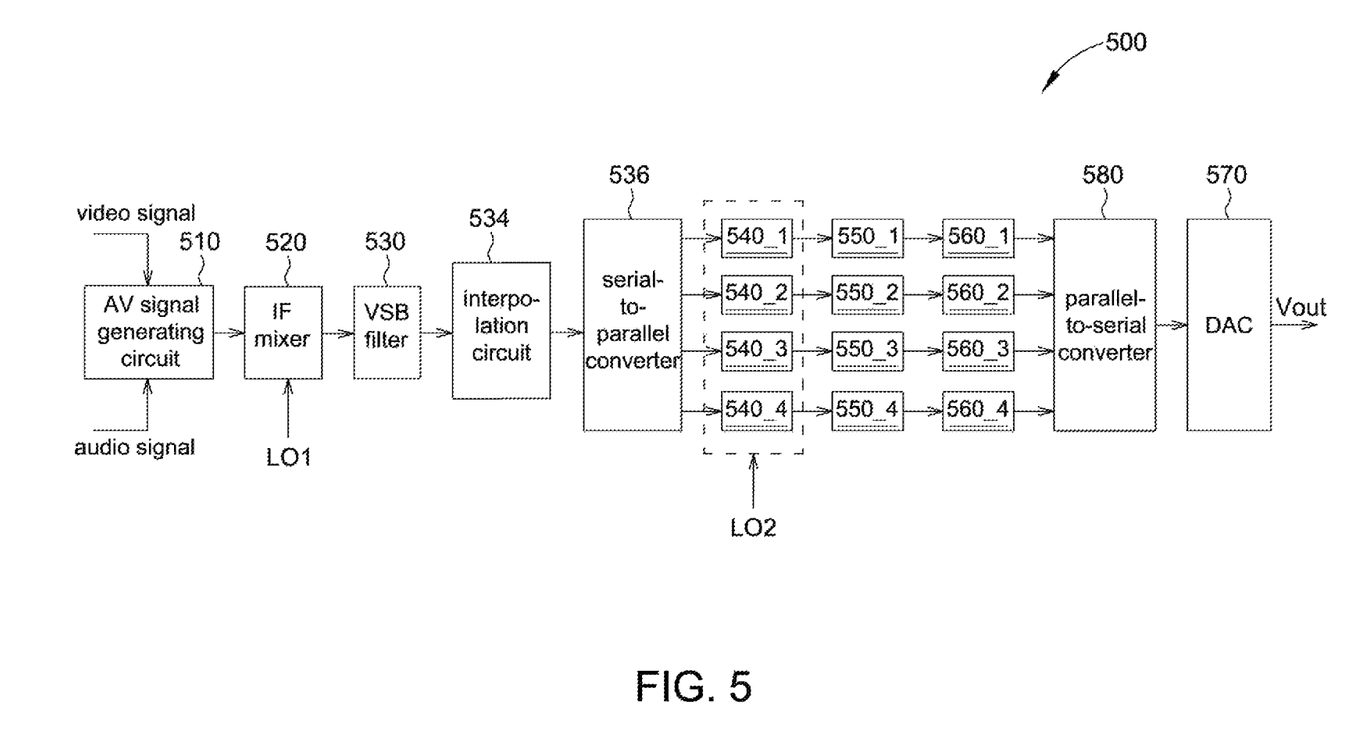
FIG. 5 is a block diagram of a television signal processing circuit according to another embodiment of the present invention.

FIG. 5 shows a block diagram of a television signal processing circuit 500 according to another embodiment of the present invention. As shown in FIG. 5, the television signal processing circuit 500 includes an AV signal generating circuit 510, an IF mixer 520, a vestigial sideband filter 530, an interpolation circuit 534, a serial-to-parallel converter 536, multiple RF mixers 540_1 to 540_4, multiple band-pass filters 550_1 to 550_4, multiple sigma-delta modulation circuits 560_1 to 560_4, a DAC 570, and a parallel-to-serial converter 580. In this embodiment, the television signal processing circuit 500 is a single chip, and is disposed in an STB. Further, the television signal processing circuit 500 generates a plurality of television channel signals having predetermined frequencies through an antenna of the STB to an external television. The plurality of television channel signals having the predetermined frequencies may be signals of the third and the fourth channels (with frequencies 61.25 MHz and 67.25 MHz, respectively) defined by the NTSC, or signals of the third and fifth channels (with frequencies 55.25 MHz and 63.25 MHz, respectively) defined by the PAL standard.

In an operation process of the television signal processing circuit 500, the AV signal generating circuit 510 receives a digital video signal and a digital audio signal to generate a digital AV signal, whose spectrum diagram may be referred from FIG. 2. The IF mixer 520 converts the digital AV signal to an IF AV signal by using a local oscillation signal LO1, and the vestigial sideband filter 530 filters the IF AV signal to generate a filtered IF AV signal. FIG. 3 shows a spectrum diagram of the IF AV signal and the frequency that the vestigial sideband filter 530 allows passing. The interpolation circuit 534 samples and interpolates the filtered IF AV signal to generate multiple filtered IF AV signals to the serial-to-parallel converter 536. By increasing the number of samples by the interpolation circuit, the probability of interfering subsequent signals as a result of in-band quantized noises may be reduced and the signal accuracy may be increased. The serial-to-parallel converter 536 transmits the multiple filtered IF AV signal having been interpolated to the multiple RF mixers 540_1 to 540_4. Each of the multiple RF mixers 540_1 to 540_4 converts the up-converted signal received to an RF AV signal by using a local oscillation signal LO2. Further, the band-pass filters 550_1 to 550_4 filter the RF AV signals outputted by the RF mixers 540_1 to 540_4 to generate filtered RF AV signals. FIG. 4 shows a spectrum diagram of the RF AV signals and the frequency that the band-pass filters 550_1 to 550_4 allow passing. In this embodiment, there are four RF mixers that perform signal processing in a parallel manner, and so the serial-to-parallel converter 536 transmits four filtered IF AV signals having been interpolated respectively to the RF mixers 540_1 to 540_4, for example. One person skilled in the art may perform signal processing in a parallel manner by using fewer or more RF mixers based on requirements. Next, the sigma-delta modulation circuits 560_1 to 560_4 performs a noise shifting process on the filtered RF AV signals, respectively, to generate processed signals. The processed signals are then processed by the parallel-to-serial converter 580, transmitted to the DAC 570 and converted to an analog AV signal Vout, which is then transmitted to a television via an antenna. The parallel-to-serial converter 580 corresponds to the serial-to-parallel converter 536. In this embodiment, the parallel-to-serial converter 580 is coupled between the sigma-delta modulation circuits 560_1 to 560_4 and the DAC 570. In practice, the parallel-to-serial converter 580 may be connected between the band-pass filter 550 and the sigma-delta modulation circuits 560_1 to 560_4, or after the DAC 570. The number of the corresponding band-pass filters and the number of the corresponding sigma-delta modulation circuits may be adjusted by one person skilled in the art.

The operation concept of the television signal processing circuit 500 in FIG. 5 is similar to that of the television signal processing circuit 100 in FIG. 1. In the television signal processing circuit 500, the object of adopting multiple RF mixers, band-pass filters and sigma-delta modulation circuits is to achieve parallel operations, so as to lower the requirement on the operation speed for the signal processing circuit 500.

In the television signal processing system 500 in FIG. 5, most signal processing units and all of the filtering circuits are implemented by digital circuits, and are integrated in one single chip, thereby significantly reducing the circuit structure and production costs. Further, by adjusting the signal to the intermediate frequency to perform vestigial sideband filtering, a real filter having a simpler structure, instead of a SAW filter or a complex filter, may be adopted in the television signal processing circuit 500 to further lower design and production costs. Further, by increasing the number of samples through the interpolation circuit, the probability of interfering subsequent signals as a result of in-band quantized noises may be reduced and the signal accuracy may be increased. Further, the parallel processing of the serial-to-parallel converting coordinating with the parallel-to-serial converter overcomes the limitation of the processing speed of the circuit.

Figure 6:
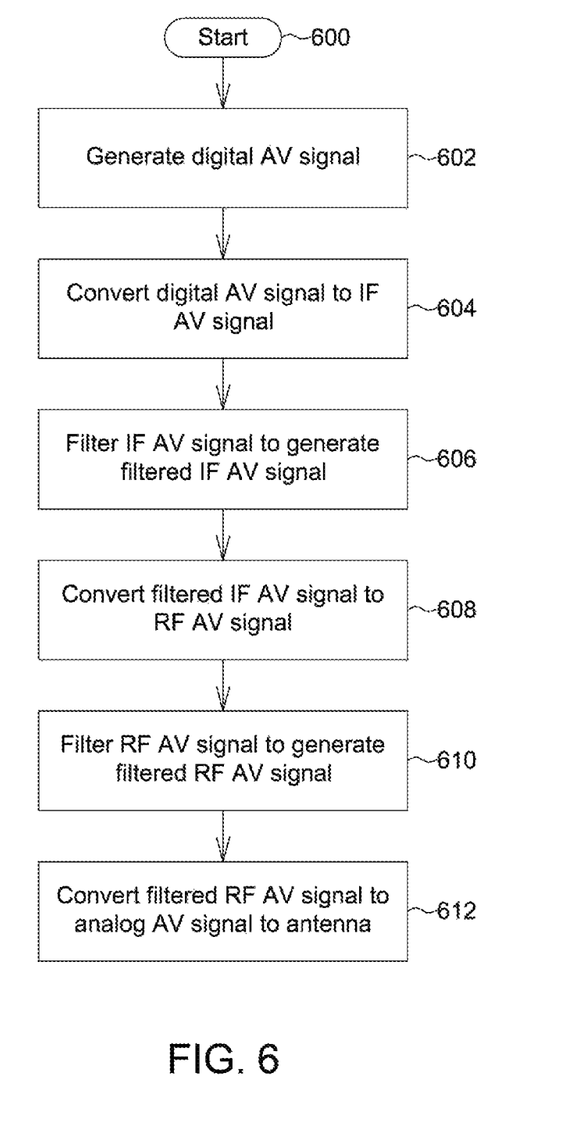
FIG. 6 is a flowchart of a television signal processing method according to an embodiment of the present invention.

FIG. 6 shows a flowchart of a signal processing method according to an embodiment of the present invention. Referring to FIG. 1 to FIG. 5 as well as the above disclosure, details of the process of are given below.

In step 600, the process begins.

In step 602, a digital AV signal is generated.

In step 604, the digital AV signal is converted to an IF AV signal.

In step 606, the IF AV signal is filtered to generate a filtered IF AV signal.

In step 608, the filtered IF AV signal is converted to an RF AV signal.

In step 610, the RF AV signal is filtered to generate a filtered RF AV signal.

In step 612, the filtered RF AV signal is converted to an analog AV signal and transmitted to an antenna.

In summary, in the television signal processing circuit of the present invention, the main signal processing circuits and filters are implemented by digital circuits, and the filters are real filters. Therefore, the overall circuit structure does not need to be additionally provided with more costly SAW filters or complex filters, and significantly reduces design and production costs.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A television signal processing circuit, applied to a set-up box (STB), comprising:
    an audio/video (AV) signal generating circuit, generating a digital AV signal;
    an intermediate-frequency (IF) mixer, generating an IF AV signal according to the digital AV signal;
    a first filter, filtering the IF AV signal to generate a filtered IF AV signal;
    a radio-frequency (RF) mixer, generating an RF AV signal according to the filtered IF AV signal;
    a second filter, filtering the RF AV signal to generate a filtered RF AV signal; and
    a digital-to-analog converter (DAC), converting the filtered RF AV signal to an analog AV signal and transmitting the analog AV signal to an antenna.

2. The television signal processing circuit according to claim 1, wherein the first filter is a vestigial-sideband (VSB) filter.

3. The television signal processing circuit according to claim 1, wherein the second filter is a band-pass filter.

4. The television signal processing circuit according to claim 1, wherein the filtered IF AV signal is a first filtered IF AV signal, the television signal processing further comprising:
    an interpolation circuit, interpolating the first filtered IF AV signal to generate a second filtered IF AV signal, and transmitting the first and second filtered IF AV signal to the RF mixer.

5. The television signal processing circuit according to claim 1, further comprising:
    a sigma-delta modulation circuit, performing a noise shifting process on the filtered RF AV signal to generate a processed RF AV signal, and transmitting the processed RF AV signal to the DAC.

6. The television signal processing circuit according to claim 1, disposed in the STB.

7. The television signal processing circuit according to claim 1, wherein the first filter is a real filter.

8. The television signal processing circuit according to claim 1, wherein the second filter is a real filter.

9. The television signal processing circuit according to claim 4, wherein the RF mixer is a first RF mixer, the television signal processing circuit further comprising:
    a second RF mixer; and
    a serial-to-parallel converter, transmitting the first and second filtered RF AV signals to the first and second RF mixers, respectively.

10. The television signal processing circuit according to claim 6, wherein a frequency range of the filtered RF AV signal is one of 61.25 MHz and 67.25 MHz.

11. The television signal processing circuit according to claim 6, wherein a frequency range of the filtered RF AV signal is one of 55.25 Mhz and 63.25 MHz.

12. A television signal processing method, applied to a set-up box (STB), comprising:
    generating a digital audio/video (AV) signal;
    generating an intermediate-frequency (IF) AV signal according to the AV signal;
    filtering the IF AV signal to generate a filtered IF AV signal;
    generating a radio-frequency (RF) AV signal according to the filtered IF AV signal;
    filtering the RF AV signal to generate a filtered RF AV signal; and
    converting the filtered RF AV signal to an analog AV signal, and transmitting the analog AV signal to an antenna.

13. The television signal processing method according to claim 12, wherein the filtered IF AV signal is a first filtered IF AV signal, the RF AV signal is a first RF AV signal, and the step of generating the RF AV signal according to the filtered IF AV signal comprises:
    interpolating the first filtered IF AV signal to generate a second filtered IF AV signal; and
    converting the first and second filtered IF AV signal to the first RF AV signal and a second RF AV signal, respectively.

14. The television signal processing method according to claim 12, wherein the step of converting the filtered RF AV signal to the analog AV signal comprises:
    performing a noise shifting process on the filtered RF AV signal to generate a processed RF AV signal; and
    converting the processed RF AV signal to the analog AV signal.

15. The television signal processing method according to claim 12, wherein a frequency range of the filtered RF AV signal is one of 61.25 MHz and 67.25 MHz.

16. The television signal processing method according to claim 12, wherein a frequency range of the filtered RF AV signal is one of 55.25 Mhz and 63.25 MHz.

17. The television signal processing method according to claim 12, wherein the step of filtering the IF AV signal to generate the filtered IF AV signal comprises:
   filtering the IF AV signal by a real vestigial-sideband (VSB) filter to generate the filtered IF AV signal.

18. The television signal processing method according to claim 12, wherein the step of filtering the RF AV signal to generate the filtered RF AV signal comprises:
   filtering the RF AV signal by a real band-pass filter to generate the filtered RF AV signal.

* * * * *